US00RE33969E

United States Patent [19]

Richter

[11] E Patent Number: Re. 33,969

[45] Reissued Date of Patent: Jun. 23, 1992

[54] BINARY SYRUP SYSTEM BAG AND VALVE

[75] Inventor: Simon J. Richter, Marietta, Ga.

[73] Assignee: The Coca-Cola Company, Atlanta, Ga.

[21] Appl. No.: 610,924

[22] Filed: Nov. 9, 1990

Related U.S. Patent Documents

Reissue of:

[64] Patent No.: 4,913,316
Issued: Apr. 3, 1990
Appl. No.: 224,645
Filed: Jul. 27, 1988

[51] Int. Cl.[5] ..... B65D 35/22

[52] U.S. Cl. ..... 222/1; 222/94; 222/105; 222/129.1; 222/136; 222/183; 222/145; 222/464; 137/594; 251/149.6

[58] Field of Search ..... 222/105, 135, 136, 183, 222/129.1, 129.2, 129.3, 129.4, 130, 131, 94, 464; 251/149.4, 149.6; 137/594

[56] References Cited

U.S. PATENT DOCUMENTS

| | | | |
|---|---|---|---|
| 2,198,524 | 4/1940 | Berwick et al. | 222/129.4 X |
| 2,359,648 | 10/1944 | Jones | 137/594 |
| 3,177,896 | 4/1965 | Mosher et al. | 137/594 |
| 3,197,071 | 7/1965 | Kuster | 222/105 X |
| 3,206,074 | 9/1965 | Hoffmann | 222/105 X |
| 3,323,682 | 6/1967 | Creighton, Jr. et al. | 222/105 X |
| 4,286,636 | 9/1981 | Credle | 222/501 X |
| 4,316,557 | 2/1982 | Benoun et al. | 222/129.1 |
| 4,524,458 | 6/1985 | Pongrass et al. | 222/105 X |
| 4,528,180 | 7/1985 | Schaeffer | 222/92 X |
| 4,549,675 | 10/1985 | Austin | 222/129.1 |
| 4,601,410 | 7/1986 | Bond | 222/105 X |
| 4,708,266 | 11/1987 | Rudick | 222/129.1 |
| 4,736,872 | 4/1988 | Ryder et al. | 222/105 X |
| 4,796,788 | 1/1989 | Bond | 222/94 |
| 4,838,457 | 6/1989 | Swahl et al. | 222/105 X |

FOREIGN PATENT DOCUMENTS

| | | |
|---|---|---|
| 0134142 | 3/1985 | European Pat. Off. . |
| 0156500 | 10/1985 | European Pat. Off. . |
| 102668 | 6/1898 | Fed. Rep. of Germany . |

*Primary Examiner*—Kevin P. Shaver

[57] ABSTRACT

A binary syrup system bag and valve for beverage dispensing including a pair of separate syrup bags holding two different syrup components, a single spout connected to both bags and a bag valve connected to the spout for opening or closing liquid communication to the bags. The spout and valve have two separate liquid flow channels therethrough, one for each bag. A quick-disconnect coupling is connected to the valve for opening the valve and allowing the syrup to be fed to a beverage dispenser. The connection of the valve parts and the connection between the valve and the spout are snap-fit, liquid-tight interference fits.

15 Claims, 4 Drawing Sheets

BINARY SYRUP SYSTEM BAG AND VALVE

Matter enclosed in heavy brackets [ ] appears in the original patent but forms no part of this reissue specification; matter printed in italics indicates the additions made by reissue.

BACKGROUND OF THE INVENTION

This invention relates to beverage dispensing systems and in particular to a binary syrup system in which the syrup is provided in two separate containers holding two different syrup components rather than being provided in one single container. This allows certain component(s) to be separated from certain other component(s), until just prior to dispensing, when the two components are combined to form the complete syrup.

A large number of beverage dispensing systems are known for use with both sugar syrups and diet syrups, and for use with various types of syrup containers such as pressurized tanks (figals) and non-pressurized plastic bags (bag-in-box) used in conjunction with syrup pumps. The known bag-in-box bags include a spout and a valve connected to the spout for opening or closing liquid communication with the syrup in the bag. At the retail outlet a quick-disconnect coupling is attached to the bag valve to open it and to allow syrup to be fed to a beverage dispenser by means of a syrup pump connected between the bag and the dispenser.

SUMMARY OF THE INVENTION

A binary syrup system for beverage dispensing including a pair of flexible, collapsible bags *is* positioned inside of a single bag-in-box box. A single spout is connected to both bags and a valve is connected to the spout. The spout and the valve each have two separate liquid flow channels therethrough, one for each bag. The flow channels through the valve are open at one end thereof to a respective bag and are closed at the other end by a poppet valve. The valve includes means for connecting it to a syrup hose coupler, and attachment of the coupler causes the poppet valve to open. A pair of dip strips is preferably connected to the spout, with one in each bag.

The connections between the two parts of the valve and between the valve and the spout are snap-in interference fits to provide easy liquid-tight connections that can be made by automatic machinery. When the binary syrup bag and valve are shipped to the retail outlet, a quick-disconnect coupling that is permanently installed in the retail outlet is attached to the valve to move the valve to its open position to allow each of the two syrup components to be dispensed from the two bags and fed to the beverage dispenser.

It is an object of the present invention to provide a binary (or dual) syrup bag and valve.

BRIEF DESCRIPTION OF THE DRAWINGS

The present invention will be more fully understood from the detailed description below when read in connection with the accompanying drawings wherein like reference numerals refer to like elements and wherein.

DETAILED DESCRIPTION OF THE PREFERRED EMBODIMENT

Figure 1:
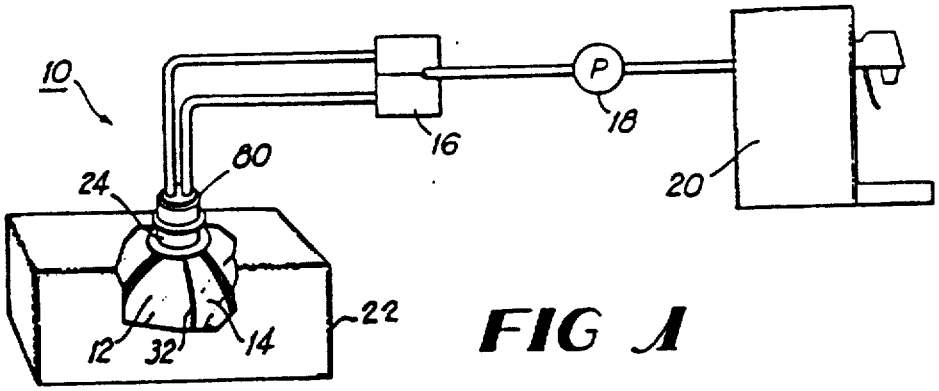
FIG. 1 is a diagrammatic view of the overall beverage dispensing system in which the binary bag and valve of this invention is used.

With reference now to the drawings, FIGS. 1 to 5 show the preferred embodiment of the present invention of a binary syrup system 10 including a pair of bag-in-box syrup bags 12 and 14 each holding a different component of the syrup, a metering device 16 for ensuring the proper ratio of the two components being fed to a dispenser, a syrup pump 18 and a beverage dispenser 20. The metering device includes two inlet ports, one for each of the syrup components, and a single outlet port for the complete syrup formed when the two components are combined in the correct ratio, for example, 1:1. The two bags 12 and 14 are contained in a single box 22. A well known bag-in-box system for syrup now uses one single five gallon bag in a box and the present invention preferably uses two two and one-half gallon bags 12 and 14 in a single box 22.

Figure 2:
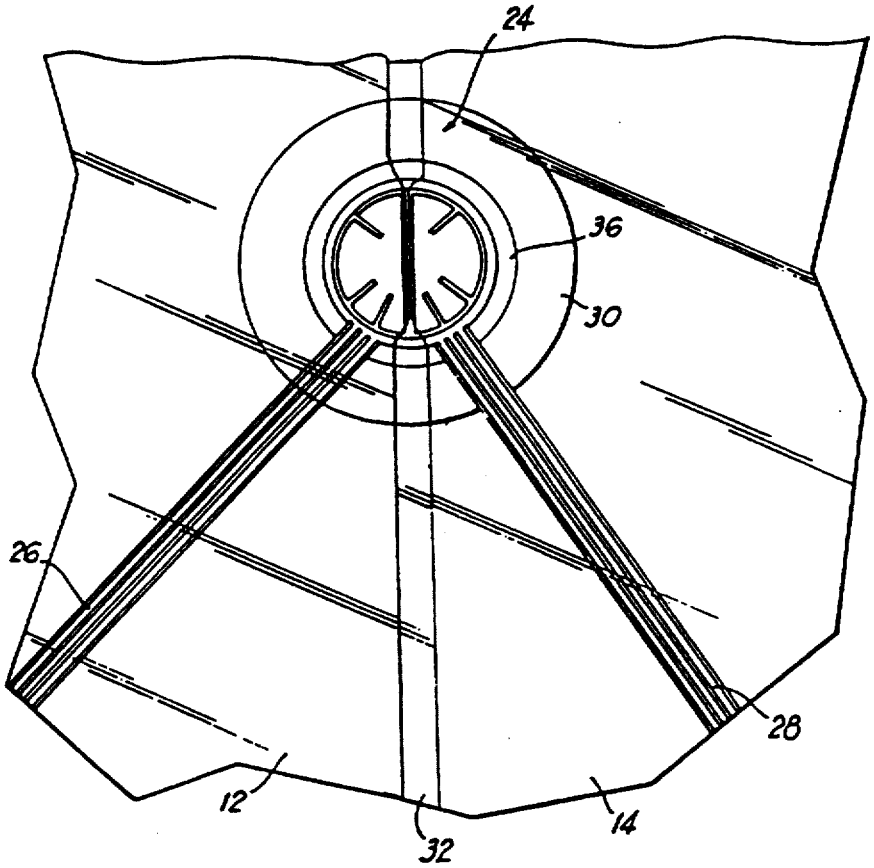
FIG. 2 is a partial plan view of the binary bag and spout of this invention.
Figure 3:
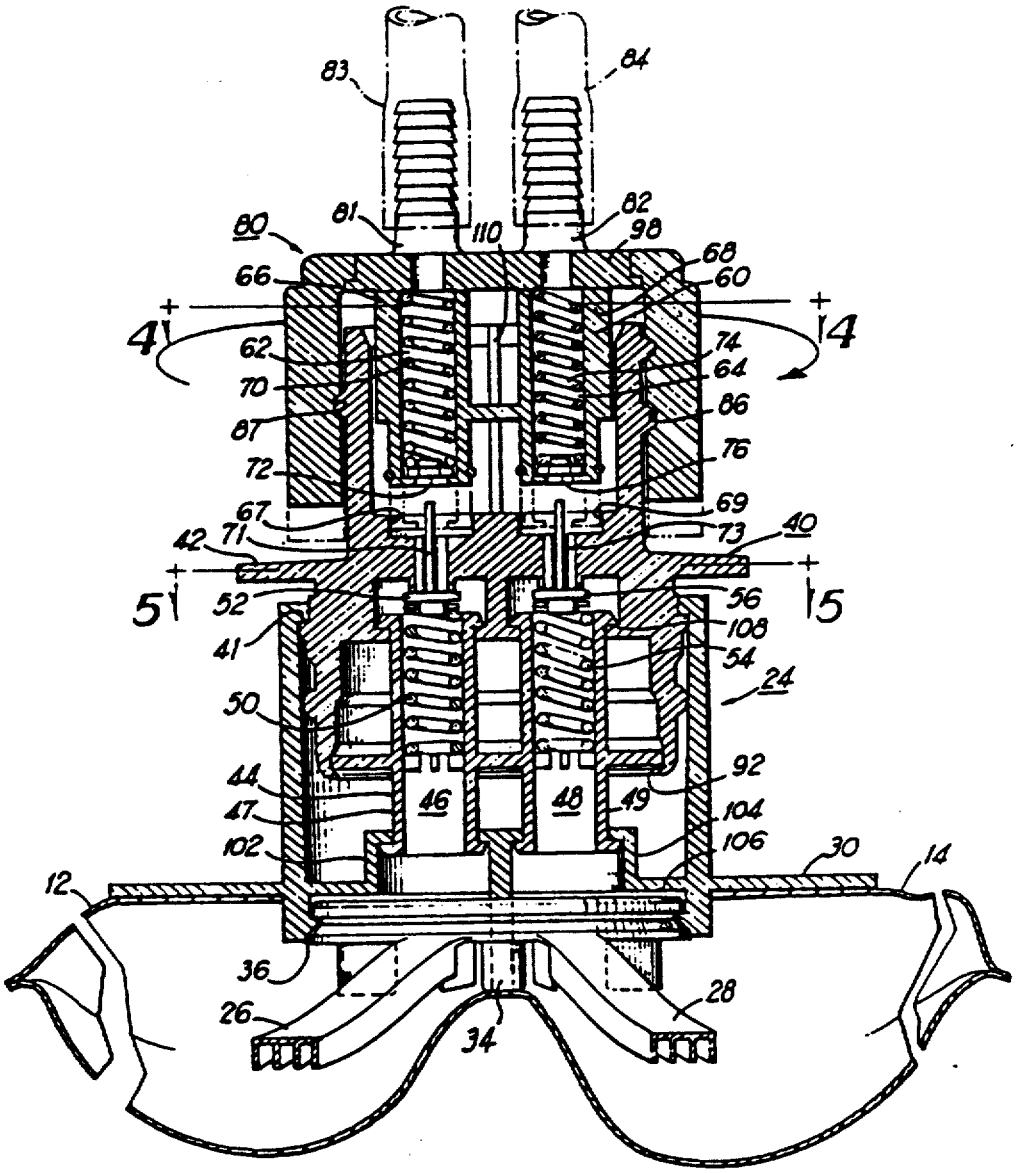
FIG. 3 is a cross-sectional side view through the spout, bag valve and quick-disconnect coupling of this invention.

FIG. 2 shows the two bags 12 and 14 and a spout 24 connected to both bags 12 and 14 with a dip strip 26 connected to the spout and contained in bag 12 and a dip strip 28 connected to the spout and contained in bag 14. FIG. 3 also shows the spout 24 and the manner of connecting the spout to the two bags 12 and 14. Two bags are preferably formed from one pair of bag walls, one of the walls having a single opening therethrough. The spout flange 30 is preferably heat sealed to said one wall and a liquid-tight seam 32 is used to form a single larger bag into the two separate bags 12 and 14. The seam is interrupted at the spout where the other wall is heat sealed to a bottom edge of a wall 34 which extends diametrically across the bottom opening in the spout 24. The two dip strips 26 and 28 are connected to a single ring 36 which snaps into place in the bottom opening of the spout 24. Other arrangements can be used for connecting dip strips to the spout and other shapes and sized of dip strips can be used. Alternatively, the present invention can be used without any dip strips.

Figure 4:
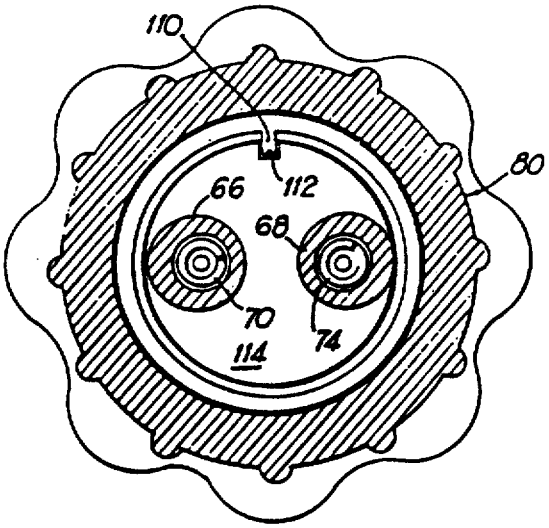
FIG. 4 is a cross-sectional view through FIG. 3 taken along line 4—4 thereof.
Figure 5:
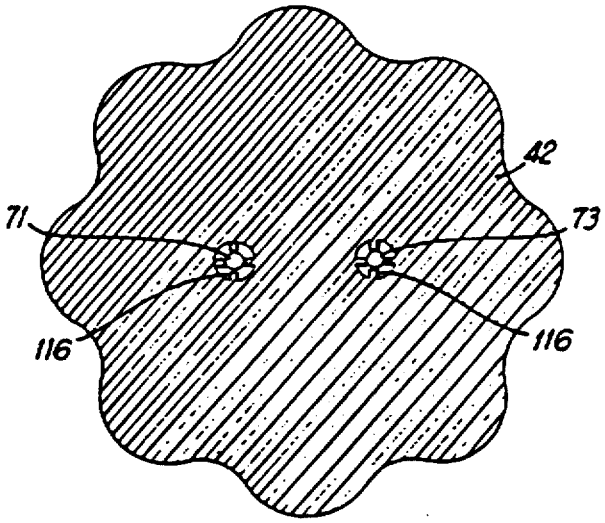
FIG. 5 is a cross-sectional view through FIG. 3 taken along line 5—5 thereof.

The valve 40 of the present invention will now be described with reference to FIGS. 3, 4 and 5. The valve 40 provides for two separate liquid channels in one valve structure. One end of each channel is open to one of the bags. The other end of each channel is closed by a poppet valve which is activated (opened) when a coupler is attached to the open side of the valve.

The valve includes the following components. A valve body 42 which incorporates the seats for the two poppet valves 52 and 56. The open end of the valve body has been designed to receive the coupler 80 which has two cylinders 66 and 68 which fit in the two sockets 67 and 69 containing the poppet activating pins 71 and 73. External thread 86 is provided to receive a screw cap to protect the valve during storage and shipping. The other end of the valve body has been designed to receive the spring retainer/connector 44 to the spout. The outside of the cylindrical section of the valve body has been designed to provide two click stops inside the spout. The first one for temporary insertion of the valve body in the bag spout. This arrangement allows for use of the valve as a temporary "dust cap" until each side of the dual bag is ready to be filled. The second click stop is for permanent installation of the valve after filling.

The valve 40 also includes the two poppet valves 52 and 56 with integral activating pins 71 and 73. A pair of springs 50 and 54 bias the poppets against the valve seats.

The spring retainer/connector 44 to the spout contains the springs 50 and 54 providing sealing pressure for each of the two poppets. The connector 44 is held in place by a groove 92 in the valve body. Each of the two flow channels in the connector 44 containing a spring is locked into the valve body with a snap in interference fit seal. The same sealing arrangement is used to seal the other end of each channel into a corresponding socket 94 and 96 in the spout 24.

The valve body, the connector, the two springs and two poppet valves, when assembled together are the valve.

The spout is permanently sealed to the bags. Each bag compartment is connected to one of the two channels in the valve.

FIG. 3 shows the valve 40 in its closed position in solid lines and in open position in dotted or phantom lines. FIG. 3 also shows the coupler 80 including a pair of stainless steel barb connectors 81 and 82 connected to hoses 83 and 84 (the hoses are not transparent but are shown as such for clarity). The valve 40 includes external screw threads 86 that mate with internal screw threads 87 in the coupler 80. The quick-disconnect coupler 80 is simply screwed on to the valve 40 to open the valve allowing syrup to be pumped out of the bags 12 and 14. The coupler 80 includes the connectors 81 and 82, preferably of stainless steel molded to a central element 98, the nut 99 that can rotate relative to the element 98, and the two cylinders 66 and 68 with their spring loaded caps 72 and 76 that contact and move the poppet activating pins 71 and 73. The two cylinders are attached or made integrally with the element 98. The caps 72 and 76 have flow passages therethrough. As the coupler 80 moves downwardly (as viewed in FIG. 3) the springs 70 and 74 eventually are compressed to an extent that they exert a greater force on the poppet valves than is exerted by the springs 50 and 54 causing the poppet valves 52 and 56 to open (to move downwardly away from their valve seats as viewed in FIG. 3). The valve 40 is now open, so that when the pump 18 is operated, syrup will be fed out of the bags 12 and 14 to the dispenser.

The spring retainer/connector 44 is attached to the body 42 by a snap-in, liquid-light interference fit at 108 and also by the groove 92. The lower end (as viewed in FIG. 3) of the two cylinders 47 and 49 snap-fit in a liquid-tight interference fit to the upper end of the two cylinders 102 and 104 that extend up from a lower wall 106 of the spout. The body 42 is snap-fit to the spout at 41 with an interference although a liquid-tight fit is not necessary at 41.

The connector 44 has two flow channels 46 and 48 therethrough in cylinder 47 and 49 which retain the springs 50 and 54. The two cylinders 66 and 68 in the coupler 80 have two flow channels 62 and 64 respectively and retain the springs 70 and 74 respectively.

The snap-fit feature of the valve body and connector and of the valve into the spout allow for ease of assembly and also of automated assembly, if desired.

When it is desired to fill the bags, the valve is removed from the spout, the bags filled, and then the spout is reinserted [and] *at* this time for a permanent attachment. The various snap-fits are made possible because of the use of circular cross-section passages and circular retaining flanges.

To properly orient the coupler 80 to the valve 40 so that the liquid flow channels will be in proper alignment and so that the cylinders 66 and 68 will be properly inserted into the sockets 67 and 69, a keyway is provided. A rib 110 in the valve body is received in a slot 112 in the plate 114 connected to the cylinders 66 and 68. FIG. 5 shows guide ribs 116 for the pins 71 and 73. It is understood that chamfered or tapered edges are provided at all snap-fit area.

Figure 6:
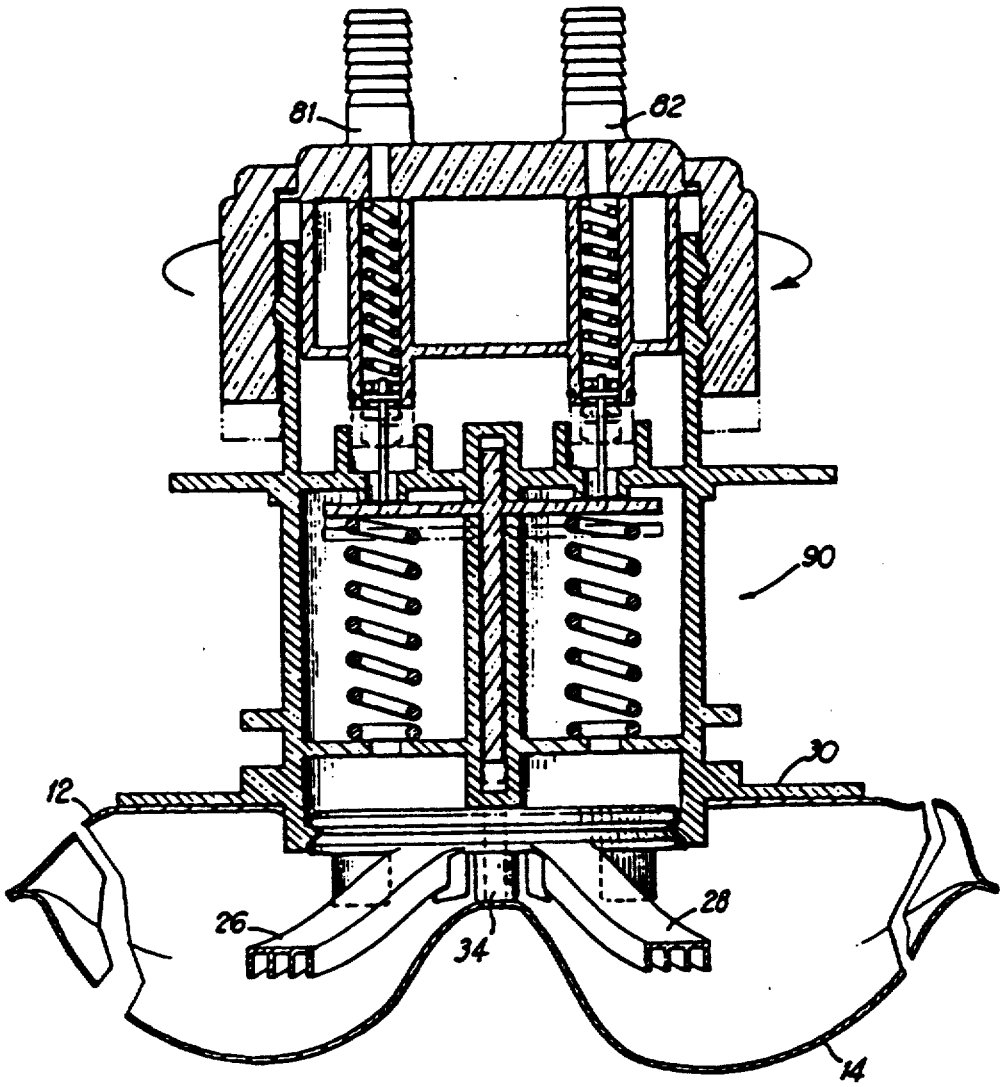
FIG. 6 is a cross-sectional view through a spout, bag valve, and coupling according to an alternative embodiment of this invention.

FIG. 6 shows an alternative embodiment of a valve and coupler according to another embodiment of the present invention.

While the preferred embodiment of this invention has been described above in detail, it is to be understood that variations and modifications can be made therein without departing from the spirit and scope of the present invention. Although the two bags are shown as being connected, this is not essential; they can be separated with the only connection being the spout.

What is claimed is:

1. A binary bag for use as a container for two syrup components to be dispensed through a beverage dispenser comprising:

(a) a first and a second bag wall including a liquid-tight seam down the middle of said first and second bag walls thereby defining two chambers;

(b) a spout opening in said first bag walls directly in line with said seam, said seam being interrupted at said spout opening;

(c) a single spout, having a pair of separate liquid flow channels therethrough, disposed on said spout opening, with one of said flow channels in liquid communication with one of said chambers and the other flow channel in liquid communication with the other of said chamber, said spout having a diametric member diametrically disposed thereon;

(d) means for sealing *the first* and said second bag [wall] *walls* on said diametric member of said spout; and (e) means for selectively withdrawing the two syrup components simultaneously from said chambers.

2. The bag as recited in claim 1 wherein said means for selectively withdrawing the two syrup components simultaneously comprises:

a valve connected to said spout, said valve having a pair of separate liquid flow conduits therethrough in liquid communication with a respective one of said liquid flow channels; and means for moving said valve from closed to open position when said spout is coupled to the beverage dispenser.

3. The bag as recited in claim 2 wherein said valve is connected to said spout by snapping thereinto with a liquid-tight interference fit.

4. The bag as recited in claim 2 wherein said valve further comprises:

a pair of poppet valves each disposed in one of said liquid flow conduits;

means for attaching a quick-disconnect coupling to said valve; and wherein said means for moving said valve from closed to open position comprises:

means coupled to said poppet valves for biasing said poppet valves in an open position when the quick disconnect coupling is attached to the means for attaching whereby the syrup components can be simultaneously withdrawn from each of said chambers.

5. The bag as recited in claim 1 including a single dip strip unit connected to said spout and including a pair of separate dip strips, one positioned in the interior of each of said chambers.

6. A binary syrup system for dispensing beverage prepared from two different syrup components comprising:

(a) a first and a second bag wall including a liquid-tight seam down the middle of said first and second bag walls thereby defining two chambers;

(b) a single spout connected partly to said first bag wall and partly to the second bag wall;

(c) a bag valve connected to said spout and being movable between open and closed positions; and (d) said spout and valve each having a pair of separate liquid flow channels therethrough, one of said flow channels being in liquid flow communication with one of said chambers and the other of said flow channels being in liquid flow communication with the other of said chambers, *said valve being connected to said spout by snapping thereinto with an interference fit therebetween and wherein said flow channels in said spout are sealed to those in said valve by said interference fit therebetween.*

7. The apparatus as recited in claim 6 wherein said spout is located on said seam.

[8. The apparatus as recited in claim 6 wherein said flow channels all have circular cross-sections and wherein said valve connects to said spout by snapping thereinto with an interference fit therebetween and wherein said flow channels in said spout are sealed to those in said valve by said interference fit therebetween.]

9. The apparatus as recited in claim 6 wherein said bag valve comprises:

(a) a valve body;

(b) a spring retainer connector below said body;

(c) a pair of separate liquid flow channels through said body and said connector;

(d) said connector being connected to said body by a snap fit with a liquid-fit interference fit therebetween;

(e) a poppet valve in each of said channels between said body and said connector, a spring in each of said channels in said connector for biasing said poppet valve closed against a valve seat in said body, and a poppet activating pin attached to each poppet valve and extending upwardly through said channel in said body, said poppet valve being in a normally closed position when no coupler is attached to said valve; and (f) said body including means for a hose coupler to said valve.

10. The apparatus as recited in claim 6 wherein said valve includes external screw threads for connecting to a quick-disconnect hose coupling.

11. The apparatus as recited in claim 10 including a hose coupling connecting to said valve, said hose coupling including means for moving said valve from its closed to its open position.

12. A method for dispensing two different syrup components from two separate containers therefor, comprising the steps of:

(a) providing a first and a second bag wall including a liquid-tight seam down the middle of said first and second bag walls thereby defining two chambers in a single bag-in-box box;

(b) providing a single spout *on the seam down the middle of said first and second bag walls, the spout* having a pair of separate liquid flow channels therethrough, each connected to one of said chambers, with one of said flow channels in liquid communication with one of said chambers and the other flow channel in liquid communication with the other of said chambers;

(c) connecting to said spout a valve having a pair of separate liquid flow conduits therethrough in liquid communication with a respective one of [said] *the* spout flow channels;

*(d) attaching a quick-disconnect coupling to said valve; and*

*(e) moving said valve from a position in which the conduits therein are closed to a position in which the flow conduits are open in response to the step of attaching the quick-disconnect coupling.*

13. The method as recited in claim 12 including attaching a single dip strip unit to said spout with a pair of separate dip strips, one positioned in the interior of each of said chambers.

14. The method as recited in claim 12 wherein said connecting step comprising snapping said valve into said spout with a liquid-tight interference fit between the members defining said respective flow channels and the respective flow conduits.

[15. The method as recited in claim 14 including attaching a quick-disconnect coupling to said valve, said attaching step including moving said valve from a liquid channel closed to a liquid channel open position.]

* * * * *